Nov. 14, 1933.  L. F. JULIEN  1,934,765
METHOD OF MAKING A STEEL SCREEN FOR WINDOW FRAMES
Filed April 15, 1931
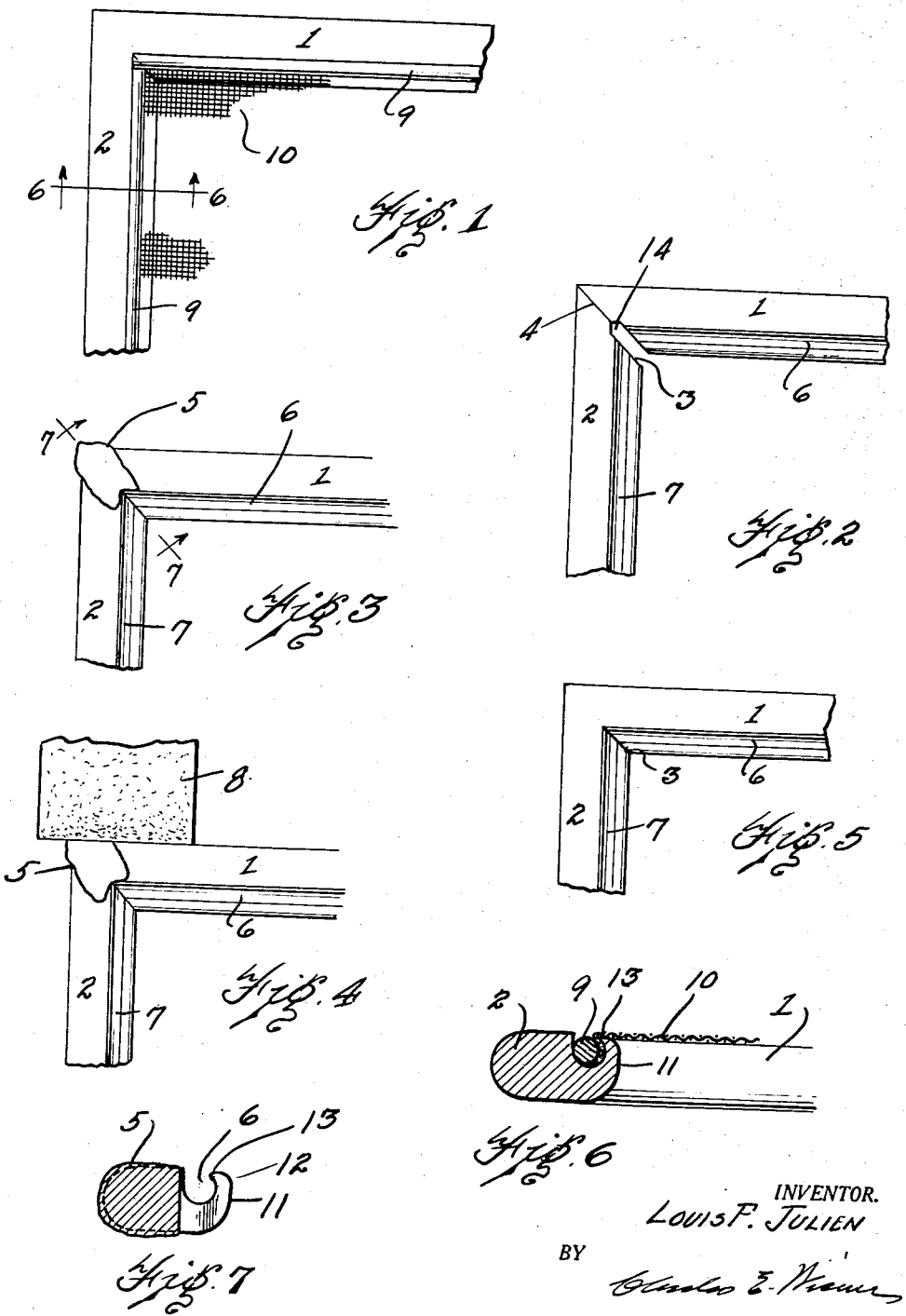
INVENTOR.
LOUIS F. JULIEN
BY
ATTORNEY.

Patented Nov. 14, 1933

1,934,765

UNITED STATES PATENT OFFICE 1,934,765

METHOD OF MAKING A STEEL SCREEN FOR WINDOW FRAMES

Louis F. Julien, Detroit, Mich., assignor to Chamberlin Metal Weather Strip Company, Detroit, Mich., a corporation of Michigan Application April 15, 1931. Serial No. 530,331

6 Claims. (Cl. 29—148)

This invention relates to steel or iron frames for window screens and the like, the object being to provide a screen frame having a groove to receive a screen retaining strip or rod, the frame being originally so formed as to permit welding at the corners without the groove for the rod becoming filled with the melted iron and flux.

Heretofore, in the attempt to manufacture screen frames of iron or steel with which the cross and side members are welded at the corner, the extruded molten metal and flux lying in the groove is practically impossible to remove even with a cutting tool without marring and/or deforming the frame.

By my improved method of construction of the frame the weld at the corner is confined to the portion thereof extending from the groove outwardly and, as is hereinafter more fully described, the extruded material is confined to that portion of the corner not occupied by the groove.

A further feature and object of the invention is to provide a steel or iron frame provided with a groove produced by the forming rolls thus avoiding the expense of cutting the groove in the metal of the frame subsequent to rolling the bar forming the same.

These and other objects and novel features of the invention are hereinafter more fully described and claimed, and the preferred form of construction of a metal frame embodying my invention is shown in the accompanying drawing in which—

Fig. 1 is an elevation of one corner of the finished screen frame.

Fig. 2 is an elevation showing a portion of a cross and side member or stile of the frame showing its form prior to the welding operation.

Fig. 3 is a view illustrative of the two members subsequent to the welding.

Fig. 4 is an elevation showing a grinding wheel applied to the welded frame to remove the extruded metal.

Fig. 5 is an elevation showing a corner of the finished frame subsequent to the grinding operation.

Fig. 6 is a section taken on line 6—6 of Fig. 1 showing the bars, the screen and the retaining rod therefor.

Fig. 7 is a cross section taken on line 7—7 of Fig. 3.

One of the principal features of the invention is shown in Fig. 2. The mitered ends of the bars 1 and 2 are offset or stepped, the grooved portion thereof being offset as at 3 relative to the meeting line 4 between the two members. Thus, the portions 4 of each of the frames originally are slightly longer than in the finished frame. In securing these parts together a flux is applied to the two contacting surfaces 4 and the bars are placed under pressure while heated at the corners whereby the members 1 and 2 are forced together until the surfaces 3 at the end of the bars 1 and 2 come to contact as in Fig. 3.

The extruded material illustrated diagrammatically at 5 lies over the side face and edges of the frame but the surface 3 of the two frames, which come to meeting relationship as shown in Fig. 3, having been unprovided with a flux and not placed under pressure, does not cause metal to be extruded into the groove 6 with which the frames are provided. It is to be noted that the surface 3 of each bar extends beyond the groove thus providing a notch 14 shown in Fig. 3 in which extruded material may accumulate without cutting the groove. Subsequent to the welding operation the corners of the frames are submitted to a grinding operation as by a grinding wheel indicated at 8 in Fig. 4 and the surfaces of the frames are ground to provide a surface in continuity with the original surface of the bars resulting in the construction as shown in Fig. 5 with no apparent line between the bars as is indicated at 4 in Fig. 2. Thus the trouble arising in previous methods of welding metal bars is avoided in that the extruded metal does not flow into the groove provided for the retaining rod for the screen.

The groove 6 may be formed in any approved manner and so shaped that the throat of the groove, as will be understood from Fig. 7, is slightly less in width than the diameter of the rod 9 to be positioned therein. The rod is inserted over the edge of the screen 10 as will be understood from Fig. 6 and, due to the form of the groove the rod is retained in place by the spring of the metal which is comparatively thin between the bottom of the groove and the inner side 11 of the bar.

This groove may also be formed by a rolling process in the formation of the bar, it first being formed of a width of the throat equal to the diameter of the recess and the edge portion 12 finally, during the period when the metal is sufficiently soft for purpose, is slightly rolled inwardly by complementally formed rolls to form a point 13 whose distance from the opposite side of the groove is less than the width thereof below the throat. By rolling the groove in the bar after the manner stated, considerable expense is avoided in comparison to the cutting of the groove.

The frame thus may be welded at the corners in a manner to avoid extrusion of metal into the groove of the frame thus making it possible to provide an iron or steel framed screen for various uses particularly for windows of houses or other buildings. Previously, frames for this purpose have been made of sheet metal but sheet metal frames are unsatisfactory in many respects and disintegrate from rust etc., whereas with a solid bar here shown which can be rust-proofed and lacquered, a frame is provided that is of great strength and will last as long as the building without deterioration from natural causes. By rolling the groove in the manner stated, the expense of manufacture is materially reduced over either a sheet metal frame or a solid metal frame in which a groove may be formed by a cutting operation as the bar when it comes from the rolls is complete and only requires to be cut in stepped form at the ends to the desired length for use.

Having thus briefly described my invention, what I claim and desire to secure by Letters Patent of the United States is—

1. The method of forming a rectangular frame of solid iron bars consisting in first providing the bars with the ends thereof cut at an angle of approximately forty-five degrees to the side faces thereof, the surface of the said angular ends being stepped to provide one portion of each of the bars extending beyond the remaining portion, applying a flux to the extending surfaces only to thereby confine the weld to the said longer portions, placing the assembled bars under pressure while submitting the contacting ends to welding heat whereby the applied pressure causes the said longer portions first in contact to become deformed or extruded until the remaining portions of said ends come to unwelded contact, and finally resurfacing the said corners to remove the extruded material.

2. The method of forming a rectangular screen frame of solid iron bars which consists in the forming of a groove therein adjacent one edge forming the end portions of each bar at an angle of approximately forty-five degrees, the end surfaces being stepped to provide bars of lesser length from end to end on the grooved side and of greater length on the outer side, assembling the bars in end to end relationship to form a rectangular frame with the longer ends in contact, and welding the said assembled frames and confining the weld to the said longer ends by submitting the same to longitudinal pressure with the corners under a welding heat whereby the said longer ends become deformed and the metal thereof extruded to permit the angular surfaces of shorter length to come to contact, and finally grinding the said corners to remove the extruded material.

3. The method of forming a rectangular iron frame for the reception of a metal screen which consists in the rolling of the bar to the desired form to provide a groove in one surface thereof adjacent one edge, the opening of the groove at the surface being less in width than the portion of the groove therebelow, forming the ends of the bar at an angle to provide a mitered joint, the end surfaces being offset providing portions of greater length from adjacent the groove to the outer edge than the remaining portion, then placing the assembled bars under end pressure during application of welding heat to the corners whereby the longer portions are deformed and the metal thereof extruded until the remaining portions of the end faces come to contact thereby confining the weld to the longer portions only, then removing the extruded metal to provide a surface at the corners in the same plane as the remaining surface of the bars.

4. The method of forming a frame of a series of iron bars which consists in cutting the ends of the bars at the desired angle with the end surfaces stepped providing a projecting and a recessed surface, placing the bars in end to end relationship with the projecting portions in contact, applying a flux to the contacting surfaces and submitting the same to a welding heat while the assembled bars are under pressure sufficient to deform the said projecting end portions to an extent permitting the recessed surfaces of the respective bars to come to contact thereby confining the weld to the projecting portions only and finally resurfacing the said welded parts to remove the extruded material.

5. The method of forming a frame of iron bars which consists first in the provision of the bars for the respective sides and ends of the frame greater in length than the final width and length of the frame, said bars having the end surfaces stepped to provide a projecting and a recessed surface, the overall length of the bars from one recessed surface to the other being of the required length to form a frame of the desired width and length, then assembling the bars in the final relationship with the portions of the bars of greater length in end contact, applying pressure to the bars while the ends in contact are submitted to welding heat thereby causing the said ends to become deformed to an extent to permit the recessed end surfaces of the bars to come to contact thereby determining the overall length and width of the finished frame and confining the line of the weld to that part of the said ends of the bars having the greater length, and finally resurfacing the portions of the frame deformed by the welding operation.

6. The method of forming a rectangular screen frame of iron bars which consists in first providing the bars with a groove formed adjacent one edge providing a recess in which the edge of a screen may be secured, forming the end portions of each bar at an angle of approximately forty-five degrees, the end portions being stepped to form bars of greater length on the outer side than on the grooved side, assembling the bars in an end to end relationship to form a rectangular frame with the longer portions of the said ends in contact, applying a flux to the said contacting ends only, and then submitting the frame as a whole to pressure under welding heat at the corners whereby the said contacting and flux treated ends become deformed and the metal thereof extruded until the remaining shorter and untreated portions of the said ends come to unwelded abutting relationship, and then finally removing the extruded metal at the corners.

LOUIS F. JULIEN.